United States Patent [19]

Calvin

[11] Patent Number: 4,773,625
[45] Date of Patent: Sep. 27, 1988

[54] CORROSION-RESISTANT OVERLAY FOR THE EDGE OF BUTTERFLY VALVES

[75] Inventor: Douglas G. Calvin, Missouri City, Tex.

[73] Assignee: Keystone International, Inc., Houston, Tex.

[21] Appl. No.: 25,215

[22] Filed: Mar. 12, 1987

[51] Int. Cl.$^4$ ............................................. F16K 1/22
[52] U.S. Cl. .................... 251/306; 251/305; 228/165
[58] Field of Search ................ 251/305, 306; 137/375; 228/165, 166

[56] References Cited

U.S. PATENT DOCUMENTS

3,749,359  7/1973  Montesi ............................. 251/306
3,958,314  5/1976  Kurkjian, Jr. .................. 251/306 X
4,141,537  2/1979  Dahle ................................. 251/306

OTHER PUBLICATIONS

Article from Welding Handbook, 6th ed., Sec. 1, 1968, pp. 8.3–8.8, as published in "Metal Progress", pp. 50–53, 1978.

Primary Examiner—A. Michael Chambers
Assistant Examiner—John C. Fox
Attorney, Agent, or Firm—Browning, Bushman, Zamecki & Anderson

[57] ABSTRACT

An overlay for a valve disk of a butterfly or similar valve is formed from a strip of corrosion-resistant material. The strip is preferably profiled to conform to the edge of the disk and has an overall length less than the circumference of the disk. Both ends of the overlay are welded to the disk in closely spaced relation with the gap therebetween being filled by the weld metal. The disk also has a flow passage between the strip and its peripheral edge with first and second inlet ports leading from one disk face to intersect the flow passage. The inlet ports are closely spaced and lie on opposite sides of the weld. Sealant material introduced into one of the two ports flows in around the disk to form a complete seal between the disk and the overlay.

21 Claims, 2 Drawing Sheets

CORROSION-RESISTANT OVERLAY FOR THE EDGE OF BUTTERFLY VALVES

BACKGROUND OF THE INVENTION

1. Field of the Invention

The present invention relates to a corrosion-resistant overlay to be applied to the edge of a valve disk and in particular to a method for applying the overlay in such manner as to assure proper positioning of the overlay and its retention in place during operation of the valve.

2. Description of the Prior Art

The prior art has recognized the need for an overlay on the edge portion of a disk in a valve with the overlay assuring proper seating of the disk in the valve. However, the prior attempts to provide such an overlay have resulted in a number of problems. For example, it is difficult to get effective sealing of elastomeric material between the disk body material and a corrosion-resistant overlay because of the creation of sealant voids, unattained critical tolerancing or leakage through the elatomeric seal itself. Other problems include ineffective joining of the ends of the corrosion-resistant overlay, due to the thin cross section and lack of weld penetration to prevent burning of the underlying seal. Another problem is the lack of positive seal ring constraints to prevent the ring from damaging downstream equipment should the primary weld fail allowing the overlay to move downstream. A further problem is the lack of positive means to prevent rotation of the overlay about the disk, such rotation generally placing the welded joint in the area of highest turbulence thereby increasing the danger of the joint breaking. Yet another problem is the critical diametrical tolerancing of a stainless steel ring overlay which, if too long, causes excessive clearance between the disk edge and the body resulting in seal leakage or an oversize disk diameter and, if too short, causes excessive weld gap resulting in a weak joint or a higher probability of seal burn during welding.

Examples of the prior art can be found in U.S. Pat. No. 3,749,359 which teaches a sealing ring made of an endless member. This ring is applied by roll forming to create a compressive metal-to-metal axial grip of the ring on the valve disk, best illustrated in FIG. 7.

Another example of the prior art may be found in U.S. Pat. No. 3,958,314 in which a strip ovrlay is placed on a lip of either the valve seat or valve member, with the ends of the strip in abutting relationship and welded together. This reference includes a number of schemes for applying a seal between the overlay and the valve disk as illustrated in FIGS. 3-7. The embodiment of FIG. 5, which is disclosed at column 3, lines 33-47, has bores at one or more locations on the valve disk communicating with a peripheral groove. A flowable, setable plastic sealant, such as epoxy resin, is introduced through the port to flow about the periphery of the disk to seal the inner face. There is no provision for assuring that the peripheral groove will be entirely filled and that voids will be avoided.

U.S. Pat. No. 4,141,537 has a valve seat with a frustoconical seating surface. The overlay has a crosssectional thickness progressively decreasing from its smaller end to its larger end to provide flexibility. The valve seat is described only in terms of a cylindrical ring member.

The present invention has for its primary object the provision of a corrosion-resistant overlay on an edge portion of a valve disk or valve member and in particular to the applicaiton of the overlay in such manner as to prevent the above-discussed disadvantages from occurring.

SUMMARY OF THE INVENTION

The present invention is in the method of applying a corrosion-resistant overlay to a valve disk and the resulting product thereof. The valve disk has a peripheral edge defining a surface with an outwardly directed flow passage between the surface and overlay. At least two ports lead from one face of the disk into the flow passage with two of the ports being closely spaced. A third port would preferably be substantially diametrically opposed to the first and second ports and could be symmetrical thereto. Additional ports could be spaced about the periphery. A strip of corrosion-resistant material having an overall length less than the circumference of the disk is formed into a channel configuration matching the outer profile of the disk. One end of the strip is welded to the disk, this first weld lying between the first and second ports. The strip is wound about the disk and the second end is likewise welded to the valve disk between the first and second ports and the space between the ends of the strip and welds is filled with weld metal, which metal also fills the flow passage beneath the welds. The weld metal is ground to the proper outer profile of the disk. A sealant is introduced into at least one of the at least two ports to flow circumferentially about the disk and exit from another port, this indicating that the groove is entirely filled.

The thus formed valve disk and overlay assembly provide redundant welding of the overlay to prevent it from coming loose from the valve disk as well as preventing rotation of the overlay about the disk. The subject valve disk and overlay assembly also provides for complete sealing between the overlay and the valve disk obviating any possibility for the creation of voids or damage to the seal during welding operations. The subject assembly of valve disk and overlay is also economical to produce and assemble since no extensive forming and/or sizing arrangements are necessary in order to achieve the desired tolerancing. Further, no extensive application tooling is necessary so that the subject invention can be readily applied to any size valve disk.

BRIEF DESCRIPTION OF THE DRAWINGS

The present invention will now be described by way of example with reference to the accompanying drawings in which.

DESCRIPTION OF THE PREFERRED EMBODIMENT

Figure 1:
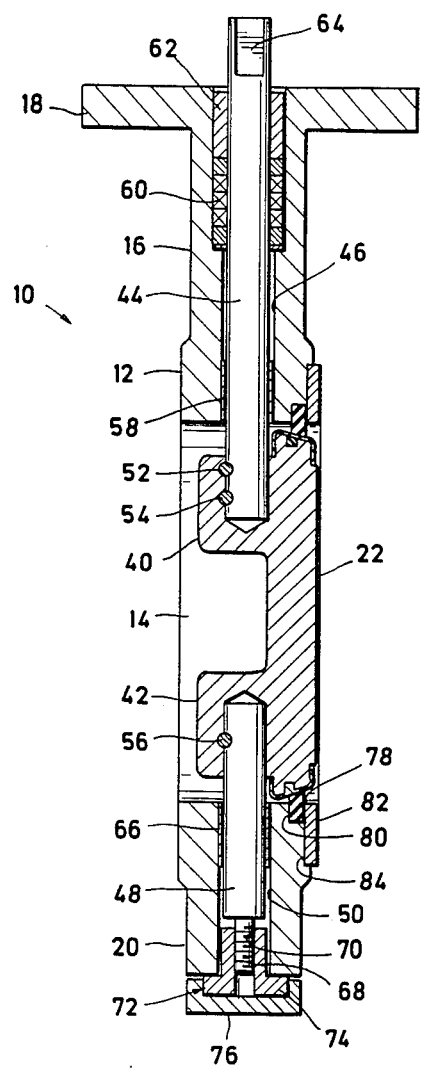
FIG. 1 is a vertical section through a valve incorporating the present invention.

Referring first to FIG. 1, there is shown a butterfly valve 10 having a generally annular body 12 with a fluid flow passage 14 therethrough. The valve body 12 is typically adapted for positioning between opposed pipe flanges (not shown). Extending upwardly from the valve body 12 is a cylindrical neck 16 integrally formed with the body 12. A flange 18 formed on the free end of the neck 16 provides a means for securing an actuator (not shown) to valve 10. Diametrically opposite neck 16 and protruding from body 12 is a boss 20.

Pivotally supported in the fluid flow passage 14 is a fluid control disk 22 having a peripheral edge or surface 24. This edge or surface has been shown with a frusto-conical form and includes an outwardly directed flow passage 26 shown here with a channel profile. Annular recesses 28, 30 are formed on both faces of the disk 22 with the intersections thereof with surface 24 being radiused. A seal overlay 32 encloses the edge or surface 24 and with marginal flanges 34, 36 extending into the recesses 28, 30, respectively. A sealant material 38 fills the flow passage 26. The disk includes integral hubs 40, 42.

The disk 22 is supported by means of a first stem 44 positioned in a bore 46 of neck 16 and a second stem 48 positioned in a bore 50 of boss 20. Stem 44 is keyed to disk 22 by means of pins 52 and 54. Similarly, the stem 48 is keyed to disk by means of a pin 56.

Stem 44 is journaled in bore 46 by means of bushing 58. Fluids are prevented from escaping from the valve through the bore 46 by means of packing rings 60 which are held in positions by menas of a packing gland 62. The upper end of stem 44 protrudes above the flange 18 and is provided with profiled flats 64 to provide a means for securing a handwheel, wrench or other device, such as an actuator (not shown), for rotating the disk 22 between the opened and closed positions of the valve 10.

The stem 48 is journaled in bore 50 by means of a bushing 66. Stem 48 also has an integral stud shaft 68 projecting from its lower end and received in a threaded bore 70 in a locator sleeve 72. The locator sleeve 72 has a flange 74 that engages the end of boss 20 to prevent movement of the locator sleeve 72 in the bore. The locator sleeve 72 maintains the disk 22 in proper position along the axis of the stems 44, 48. The locator sleeve 72 is held in place and the bore 50 is sealed against leakage of fluids by means of a cover plate 76 that is secured in place by bolts (not shown) to the boss 20 with appropriate gasketing (again, not shown) included as necessary.

Sealing between the disk 22 and body 12 around the periphery of the fluid flow passage 14 is provided by means of an annular, generally resilient seat 78 received in a counterbore 80 in one face of body 12. The seat 78 is retained therein by means of an annular seat retainer plate 82 received in a counterbore 84 on the face of body 12, the plate 82 being in turn retained in counterbore 80 by any convenient means (not shown) well known in the art.

Figure 3:
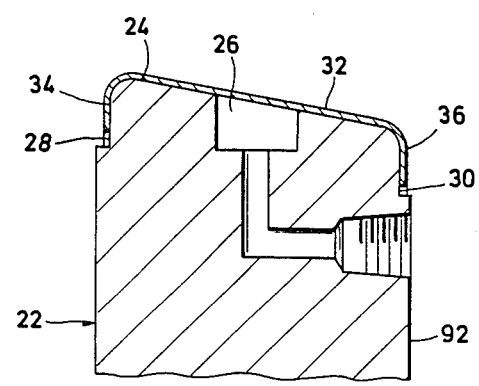
FIG. 3 is a partial section taken along line 3—3 of FIG. 2.
Figure 4:
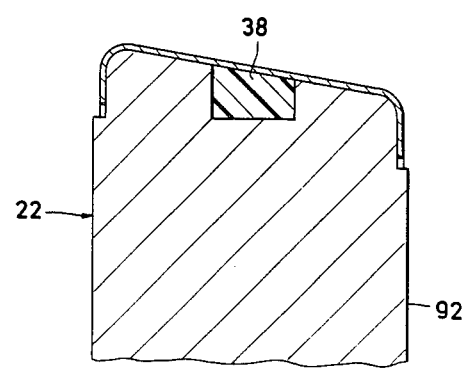
FIG. 4 is a partial section taken along line 4—4 of FIG. 2.
Figure 2:
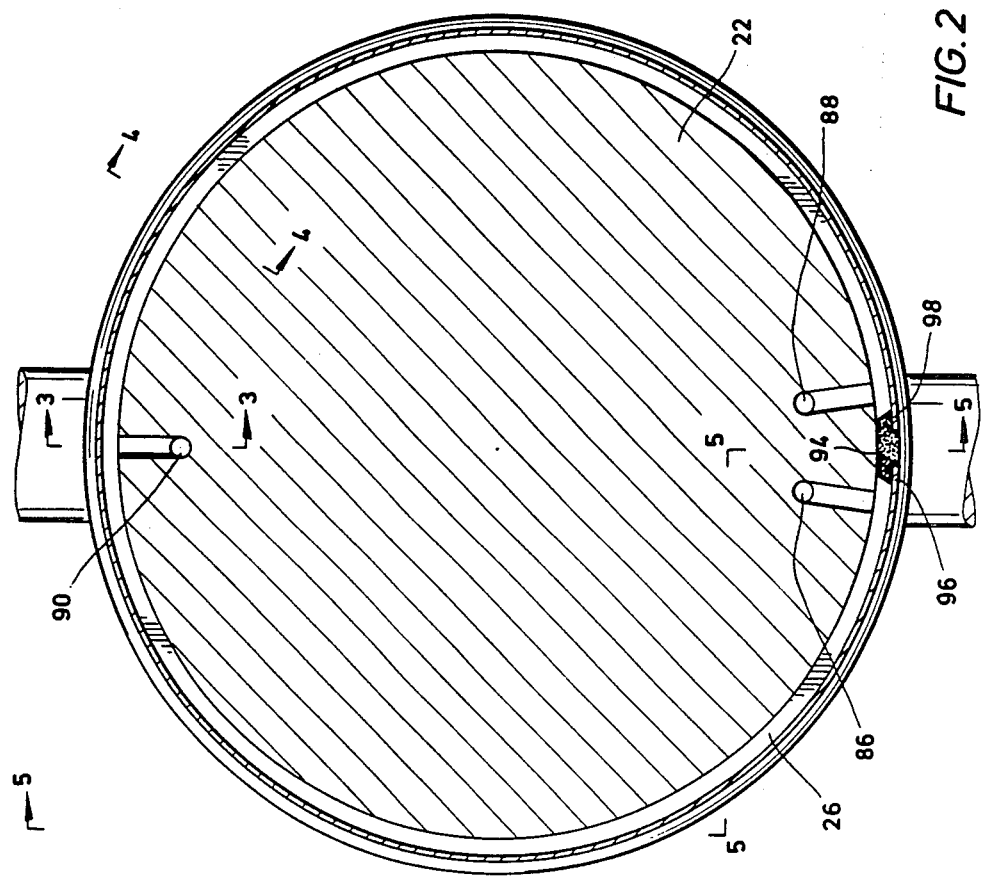
FIG. 2 is a section through the valve disk taken along line 2—2 of FIG. 5.
Figure 5:
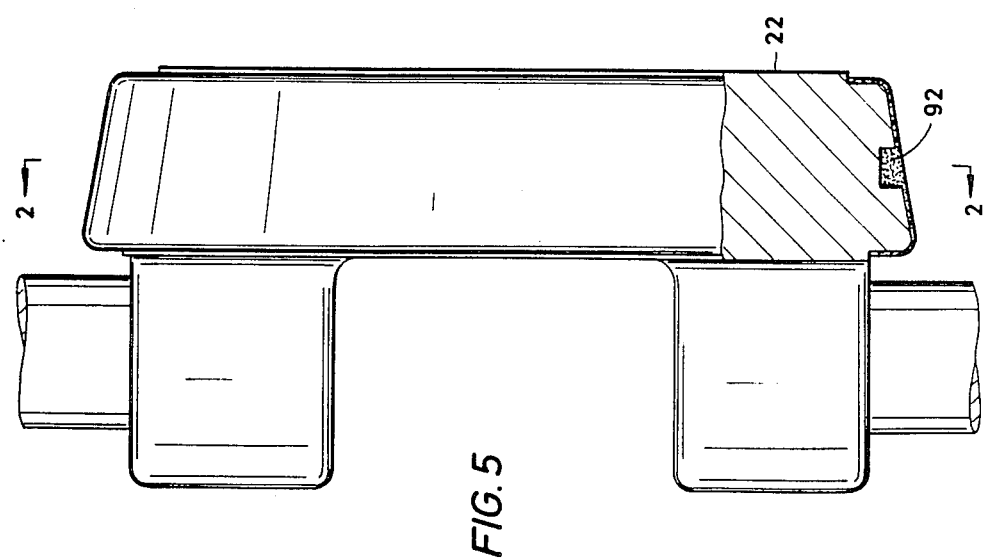
FIG. 5 is a side elevation, partly in section, taken along the line 5—5 of FIG. 2.

Turning now to FIG. 2, which is a section taken along the line 2—2 of FIG. 5, it will be noted that there are three ports 86, 88, 90 leading in from disk face 92 to intersect flow passage 26. It will also be noted that the first and second ports 86, 88 are closely spaced at one side of the disk while the third port 90 is diametrically opposed across the disk and preferably symmetrical with respect to the first and second ports. The reason for this arrangement will be explained later. Also of note in FIG. 2 is the weld joint 92 which includes a first weld securing the first end 96 of overlay 32 to the disk and a second weld securing the second end 98 of the seal to the disk. It will be noted that the first and second ends of the overlay are slightly spaced from each other and that the space therebetween is filled with weld metal. This can also be appreciated from FIG. 5 showing that the weld metal 94 fills the flow passage 26 in the area of the weld. This serves to both strengthen the weld, by giving it added mass, as well as to block the passage through the flow passage 26, for reasons which will be explained below. It will also be noted from FIGS. 3, 4 and 5 how the marginal side flanges 34, 36 are received in recesses 28, 30, respectively.

The sealant mateiral 38 is preferably a rubber-like or polymetric compound having properties of being corrosion-resistant and capable of flowing under heat and pressure and subsequently setting by vulcanization or other known curing process to a stable condition.

The overlay 32 is formed of a strip of corrosion-resistant material such as stainless steel. The length of the strip is less than the circumferential distance of the peripheral edge or surface 24. The strip is preferably initially given a channel shape to conform to the profile of the disk edge. A first end 94 of the overlay is welded to the disk 22 at a point between the first and second ports 86, 88, as shown in FIG. 2. The overlay 32 is then wound around the disk 22 and the second end 96 is secured thereto by welding. The gap between the first and second welds is then filled with further welding material 92. It will be appreciated from FIG. 5 that the welding material fills the flow passage 26 in this area. This has a two-fold effect in that it strengthens the weld by giving it a greater mass and it interrupts the overwise annular flow passage. The outer surface of the weld is then brought to the contour of the overlay 32 by any known means such as machining and/or grinding.

In this embodiment, the sealant material 38 is introduced through the first and second ports 86, 88. The sealing material will fill the flow passage 26 and flow clockwise from first port 86 and counterclockwise from second port 88 around the periphery of the disk until the excess material exits through the port 90. Thus, it will be assured that the sealant material has completely filled the space of the flow passage 26. It would likewise be possible to introduce the sealant material from the third port 90 and allow it to flow from the first and second ports 86, 88. As another alternative, only two ports 86, 88 could be formed and the sealant introduced into one until it flows from the other. A further alternative would be a number of ports spaced about the periphery of the disk 22 with the sealant being sequentially introduced to the respective ports. It will be clear to those skilled in the art that the number of ports, as well as the size and shape of the flow passage 26, will largely be determined by the size of the valve and the characteristics of the sealant material. The end result will be as shown in the section of FIG. 4, with the exception of the area of the weld which is shown in the section of FIG. 5.

It will be appreciated that the method and product of the present invention provide many advantages which are not available in the prior art. For example, the overlay is secured to the valve disk at at least two locations thus assuring that even if one weld were to break, there would be the second weld holding the overlay in place on the disk preventing it from being washed downstream where it could possibly cause problems. The welding arrangement also serves to prevent rotation of the overlay of the disk. Such rotation in the past has generally caused the weld joint on a ring to rotate to the position of highest turbulence which can result in a breakdown of the weld, loss of the ring, and possible damage downstream, as well as loss of sealing effectiveness of the valve. It should also be noted that the arrangement of the present invention allows for a full weld penetration to increase the weld area making a much stronger joint than was available in the prior art. Further, the present invention has two sealant injection points and a single exhaust point to assure that the seal groove will be completely filled with the sealant material thereby avoiding the difficulties of void formation which have been encountered in the prior art.

The foregoing disclosure and description of the invention is illustrative and explanatory thereof, and various changes in the method steps as well as in the details of the illustrative apparatus may be made within the scope of the appended claims without departing from the spirit of the invention.

What is claimed is:

1. A pivotal valve closure element for use in a fluid control valve to open and close said valve, said closure element comprising:
    a fluid control disk having a peripheral edge defining a surface;
    a disk overlay formed from a strip of corrosion-resistant material having a length less than the circumference of said disk and having a profile similar to that of said peripheral edge, a first end of said overlay being welded to a first point on the circumference of said disk and a second end of said overlay being welded to the circumference of said disk at a point closely adjacent to but spaced from said first weld; and
    welding material filling the space between said first and second ends.

2. A pivotal valve closure element according to claim 1 wherein said overlay and said surface define an annular flow passage.

3. A pivotal valve closure element according to claim 2 further comprising:
    at least first and second inlet ports in one face of said disk, each port opening into said flow passage, said first and second ports being closely spaced.

4. A pivotal valve closure element according to claim 3 wherein said first and second ends of said overlay are welded to said disk intermediate said first and second ports.

5. A pivotal valve closure element according to claim 3 wherein said welding material substantially fills said flow passage between said first and second ports.

6. A pivotal valve closure element according to claim 3 further comprising a third inlet port in one face of said disk and opening into said flow passage, said third port being substantially diametrically opposite said first and second ports.

7. A pivotal valve closure element according to claim 6 wherein said third port is substantially symmetric with respect to said first and second ports.

8. A pivotal valve closure element according to claim 2 further comprising:
    marginal flanges on said overlay engaging opposite faces of said disk.

9. A pivotal valve closure element according to claim 8 further comprising:
    recesses on each face of said disk adjacent said peripheral edge and joined thereto by radiused surfaces, said marginal flanges engaging in said recesses.

10. A pivotal valve closure element according to claim 2 wherein said flow passage comprises:
    an outwardly directed circumferential channel formed in said surface of said disk.

11. A valve assembly comprising:
    a valve body having a flow passage therethrough;
    a valve closure element pivotal within said body between open and closed positions to control the flow of fluid through said passage; and
    an annular seat in sealing engagement with said valve closure element when said valve is in said closed position;
    said valve closure element further comprising:
        a fluid control disk having a peripheral edge defining a circumferential surface,
        a disk overlay formed by a strip of corrosion-resistant material having an overall length less than the circumfrence of said disk, a first weld welding a first end of said strip to said disk and a second weld welding a second end of said strip to said disk at a point closely adjacent to but spaced from said first end; and
        weld material filling the space between said first and second ends.

12. A valve assembly of claim 11 wherein said strip and said circumferential surface define a flow passage.

13. A valve assembly according to claim 2 wherein said disk further comprises:
    at least first and second closely spaced ports entering said disk from a first face and intersecting said flow passage adjacent said first and second welds, respectively.

14. A valve assembly according to claim 13 further comprising a third port entering said disk from said first face and intersecting said flow passage, said third port lying substantially diametrically opposite said first and second ports.

15. A valve assembly according to claim 14 wherein said third port is substantially symmetrical with respect to said first and second ports.

16. A valve assembly according to claim 13 further comprising at least a third port spaced from said first and second ports and entering said disk from said first face to intersect said flow passage whereby said sealant means can be sequentially flowed between ports to fill said flow passage.

17. A valve assembly according to claim 12 wherein said flow passage comprises an outwardly directed groove formed in said surface about the circumference of said disk.

18. A valve assembly according to claim 17 further comprising an annular recess in each face of said disk, said strip having marginal flanges engaging in said annular recesses.

19. A valve assembly according to claim 11 wherein said peripheral edge defines a substantially frustoconical surface.

20. A valve assembly according to claim 11 wherein said overlay further comprises marginal flanges extending radially inward against opposing faces of said disk.

21. A valve assembly according to claim 11 wherein said disk overlay is formed in channel shape substantially matching the edge profile of said disk.

* * * * *

UNITED STATES PATENT AND TRADEMARK OFFICE
CERTIFICATE OF CORRECTION

PATENT NO. : 4,773,625
DATED : September 27, 1988
INVENTOR(S) : Douglas G. Calvin It is certified that error appears in the above-identified patent and that said Letters Patent is hereby corrected as shown below:

In column 6, line 29, change "2" to --12--.

Signed and Sealed this

Fourteenth Day of March, 1989

Attest:

DONALD J. QUIGG

Attesting Officer

Commissioner of Patents and Trademarks